(12) United States Patent
Herthan et al.

(10) Patent No.: US 11,649,660 B2
(45) Date of Patent: May 16, 2023

(54) DOOR HANDLE ASSEMBLY, VEHICLE DOOR AND VEHICLE

(71) Applicant: Brose Fahrzeugteile SE & Co. Kommanditgesellschaft, Bamberg, Bamberg (DE)

(72) Inventors: Bernd Herthan, Michelau (DE); Bertram Bopp, Bamberg (DE); Christoph Brueckner, Forchheim (DE); Carsten Topf, Schonungen (DE); Michael Richter, Würzburg (DE); Sebastian Schoedel, Eckersdorf (DE)

(73) Assignee: Brose Fahrzeugteile SE & Co. Kommanditgesellschaft, Bamberg

( * ) Notice: Subject to any disclaimer, the term of this patent is extended or adjusted under 35 U.S.C. 154(b) by 471 days.

(21) Appl. No.: 16/838,145

(22) Filed: Apr. 2, 2020

(65) Prior Publication Data
US 2020/0318402 A1    Oct. 8, 2020

(30) Foreign Application Priority Data

Apr. 2, 2019    (DE) .................. 10 2019 204 654.1

(51) Int. Cl.
| | | |
|---|---|---|
| *H01Q 1/42* | (2006.01) | |
| *H01Q 19/06* | (2006.01) | |
| *E05B 85/14* | (2014.01) | |
| *B60J 5/04* | (2006.01) | |
| *B60Q 9/00* | (2006.01) | |
| *G01S 13/931* | (2020.01) | |

(52) U.S. Cl.
CPC ............. *E05B 85/14* (2013.01); *B60J 5/0468* (2013.01); *B60Q 9/008* (2013.01); *G01S 13/931* (2013.01); *H01Q 1/42* (2013.01); *H01Q 19/06* (2013.01); *H01Q 19/062* (2013.01); *E05Y 2900/531* (2013.01); *G01S 2013/9315* (2020.01); *G01S 2013/93274* (2020.01)

(58) Field of Classification Search
CPC ........ H01Q 1/42; H01Q 19/062; H01Q 19/06; E05B 85/14; E05Y 2900/531; B60J 5/0468; B60J 5/04; B60Q 9/008; G01S 13/931
See application file for complete search history.

(56) References Cited

U.S. PATENT DOCUMENTS

| | | | | |
|---|---|---|---|---|
| 7,630,061 B2 * | 12/2009 | Lehre | ..................... | H01Q 19/06 356/5.15 |
| 2003/0063037 A1 * | 4/2003 | March | .................. | H01Q 1/3241 343/873 |
| 2013/0220011 A1 * | 8/2013 | Baer | ..................... | H01Q 19/08 343/753 |

FOREIGN PATENT DOCUMENTS

| | | |
|---|---|---|
| DE | 19951123 A1 | 2/2001 |
| DE | 19963004 A1 | 6/2001 |
| DE | 10237790 A1 | 2/2004 |
| DE | 102005033414 A1 | 1/2007 |
| DE | 102006035223 A1 | 2/2008 |
| DE | 102010042276 A1 | 4/2012 |
| DE | 102017123981 A1 | 11/2017 |
| DE | 102016220084 A1 | 4/2018 |

(Continued)

*Primary Examiner* — Hai V Tran
(74) *Attorney, Agent, or Firm* — Dickinson Wright PLLC

(57) ABSTRACT

A door handle assembly for integration into a vehicle door including a support element coupled to the vehicle door, a handle element arranged on the support element, and a radar apparatus arranged on the support element or on or in the handle element and configured to emit radar radiation and to receive reflected radar radiation.

19 Claims, 13 Drawing Sheets

(56) References Cited

FOREIGN PATENT DOCUMENTS

| EP | 2053449 | B1 | 8/2012 |
| EP | 2449406 | B1 | 12/2013 |
| EP | 3422041 | A1 | 1/2019 |

\* cited by examiner

DOOR HANDLE ASSEMBLY, VEHICLE DOOR AND VEHICLE

CROSS-REFERENCE TO RELATED APPLICATIONS

This application claims priority to German Patent Application No. DE 10 2019 204 654.1, filed on Apr. 2, 2019, the disclosure of which is hereby incorporated in its entirety by reference herein.

TECHNICAL FIELD

The present disclosure relates to a door handle assembly, a vehicle door and a vehicle.

BACKGROUND

Radar apparatuses emit electromagnetic radiation and detect the radiation reflected from objects. Depending on the radar method used, the distances of the radar apparatus to the objects, the relative movements between the radar apparatus and the objects, angular positions of the objects relative to the radar apparatus and, if the absolute movement of the radar apparatus is known, the absolute movements of the objects may be determined.

SUMMARY

One or more objects of the present disclosure may be to provide a compact door handle assembly including a radar sensor.

According to a first embodiment, a door handle assembly for integration into a vehicle door, is provided. The door handle assembly may include a support element which may be coupled to the vehicle door. The door handle assembly further may include a handle element which is arranged on the support element. A radar apparatus is configured to emit radar radiation and to receive reflected radar radiation. The radar apparatus is arranged on the support element or is fixed thereto. The radar apparatus may also be arranged on or in the handle element.

According to a second embodiment, a vehicle door including an integrated door handle assembly according to the present disclosure.

According to a third embodiment, a vehicle including at least one vehicle door according to the present disclosure.

By using a radar apparatus in a door handle assembly, radar measurements may be performed in a side region of a vehicle, thereby generating an improved environment model of the vehicle. As an example, a safety-relevant area located in the driver's blind spot may be accurately detected. Reliable detection of obstacles in the side area is also advantageous when implementing an automatically opening door, for example. If, for example, the vehicle door is to be opened by remote control, a radar sensor may detect obstacles in order to prevent the vehicle door from colliding with an object in the vicinity. By installing the radar apparatus in the door handle assembly, the need for a significant remodeling of the vehicle door to integrate the radar sensor is eliminated, and the radar apparatus blends into the appearance of the vehicle door without creating any visual disruption. As an example, there is no need to form additional recesses in the metallic door panel, which is impermeable to radar radiation, as existing components of the door handle assembly may be used as radomes for the radar apparatus.

By integrating a radar apparatus in the door handle assembly, the radar apparatus may be installed at relatively high position of the vehicle door such that accumulation of snow or dirt may be prevented. Thus, the possibility of environmentally induced functional failures is reduced.

The integration of the radar apparatus into the door handle assembly may provide an advantage that electrical connections to the door handle assembly, which already exist, may be used to ensure the functionality of the handle. Additional sensor cables of the radar apparatus may be integrated into an existing cable harness thereby reducing manufacturing costs.

According to another embodiment, the handle element is movable and the radar apparatus is fixed to the support element. By not installing the radar apparatus in a movable handle element, but fixing it to the support element, which is firmly coupled to the vehicle door, a frequent and high acceleration of the radar apparatus due to the return spring may be avoided, thus reducing the risk of damage to individual components of the radar apparatus. Additionally, it is prevented that components of the radar apparatus become loose or even detached due to the acceleration, which would affect proper operation of the radar apparatus or at least reduce the accuracy of the measurements, as this depends on the knowledge of the exact position of the radar apparatus. Since the radar apparatus is fixed to the support element the radar apparatus is immovably coupled to the support element and therefore, after installation in the vehicle door, the radar apparatus is also immovable relative to the vehicle door, i.e. the radar apparatus moves together with the vehicle door.

In accordance with another embodiment of the door handle assembly, the radar apparatus is arranged underneath a component of the door handle assembly which element is not touched when the handle of the vehicle door is operated and which is therefore less susceptible to dirt, such that a uniform operation of the radar apparatus may be achieved.

In accordance with another embodiment, the door handle assembly may include a further immovable handle element arranged on the support element. The radar apparatus is at least partially concealed by the immovable handle element. The movable handle element and the immovable handle element may be adjacent to each other and may together form the vehicle door handle. The shape of the movable and immovable handle elements may be selected on the basis of ergonomic or aerodynamic considerations. By arranging the radar apparatus below the handle element which already exists by default and which projects from the door panel, additional radomes may be eliminated, which might project when radar apparatuses are mounted separately and thereby adversely affecting the aerodynamic properties of the vehicle.

In accordance with another embodiment of the door handle assembly, the radar apparatus may include a computing device which is configured to eliminate disturbances in the propagation of the radar radiation due to diffraction effects on the immovable handle element. The computing device may include one or more microprocessors.

The door handle may be of a two-part configuration. A multi-part door handle is also conceivable. Furthermore, a one-part handle may also be provided. In this case an additional cover may be mounted separately before assembling the handle, which protects the radar apparatus as a radome.

In accordance with another embodiment of the door handle assembly, the radar apparatus is fixed to the support element in such a way that it is located below the movable handle element. In this case, a portion of the handle or the movable handle element in front of the sensor may be configured to be hollow. The movable handle element is moved when the handle is operated, however this is not critical as no measurement is performed at this point in time.

In one or more embodiments, the radar apparatus may be tilted relative to the door panel. In general, the support element may have a portion that is parallel to the door panel of the vehicle door when installed in the vehicle door. In this case, the radar apparatus is tilted relative to the parallel portion of the support element. As an example, the fixed handle element may have a tilted surface, i.e. which is not parallel to the door panel or to the parallel portion of the support element. It is advantageous in this case that the radar apparatus may be arranged parallel to this surface of the fixed handle element. This allows the radar apparatus to be aligned within a certain angular range and may provide improved support, for example, for the vehicle driver when monitoring the blind spot. In this case, the fixed handle element may serve as a radome for the radar apparatus without the need for additional components in order to protect the radar apparatus which might otherwise adversely affect the aerodynamics of the vehicle.

In one or more embodiment of the door handle assembly, a lens unit may be located at the support element. The lens unit may be configured to deflect at least part of the radar radiation emitted by the radar apparatus. For this purpose, the lens unit may include one or more lens-shaped elements which spread the radar radiation, i.e. increase the aperture angle, focus the radar radiation, i.e. reduce the aperture angle, and/or change the emitting direction of the radar radiation. As an example, by use of the radar radiation certain angular ranges may be monitored more carefully, such as a blind spot of the vehicle.

In one or more embodiments, the lens unit may include a fisheye lens configured to increase an angle of aperture of the radar radiation emitted by the radar apparatus. The radar apparatus typically may include radar antennas for transmitting radar radiation, although an angle of radar radiation transmission is, at the present time, technically limited to a maximum aperture angle of approximately 160 degrees. By using a lens unit, the attainable angle of aperture may be further increased such that an angle of aperture of almost 180 degrees may be achieved. This may ensure that as many objects as possible in the vicinity of the vehicle may be detected, and may be important for collision protection.

In one or more embodiments, the lens unit includes reflective elements. The reflective elements are configured to focus the radar radiation emitted by the radar apparatus at least partially into a predetermined solid angle range. By using reflective elements, certain particularly relevant environmental areas of the vehicle may thus be monitored more closely.

In one or more embodiments, the lens unit may include at least one portion that is opaque to radar radiation. By using an opaque portion, certain solid angle ranges may be blanked out, such as solid angle ranges which are already sufficiently well monitored by other sensors, such as other radar apparatuses. Thus, a redundancy may be avoided, wherein the evaluation of the sensor data may be accomplished faster.

The at least one portion that is opaque to radar radiation may have at least one metallic or metallized layer and/or at least one electrically conductive material. By selecting suitable conductive materials, e.g. graphite or carbon, and such as by using composite materials, certain solid angle ranges may be selectively shielded. Shielding certain solid angle ranges has the further advantage that the radiant energy of the radar radiation is increased in solid angle ranges which are not shielded and which are more interesting.

The lens unit may include a multi-layer structure, wherein different composite materials may be used. The use of such a multi-layer construction allows improved refraction properties of the lens unit, such that a wider solid angle range may be covered or an exact focusing of the radar radiation may be achieved.

In one or more embodiments, the lens unit may include a plastic element which encloses a cavity. The radar radiation emitted by the radar apparatus is focused by the cavity. Alternatively or additionally, the radar radiation emitted by the radar apparatus is at least partially shielded by the cavity. The cavity may be filled with air for this purpose. Alternatively, a predetermined liquid or gel may be introduced into the cavity, wherein the material properties of the material which is introduced into the cavity are selected such that the radar radiation is deflected in the desired manner. The exact deflection of the radar radiation depends, for example, on the refractive index of the material in the cavity.

The lens unit may be configured to be a radome to protect the radar apparatus. This may eliminate the need to use additional components as a radome, making the door handle assembly more compact and lighter. The use of the lens unit as a radome means that the lens unit protects the radar against external environmental influences, i.e. it is directly exposed to the environment when installed in the vehicle door.

In an exemplary embodiment, the door handle assembly may include a radome configured to protect the radar apparatus. The lens unit may be located between the radar apparatus and the radome. The radome may protect both the radar apparatus and the lens unit from external environmental influences. The radome may be a plastic cover, that may match the color of the vehicle, or may also be provided with a manufacturers marking to conceal the radar apparatus.

In one or more embodiments, the lens unit may be configured in such a way that a deflection of the radar radiation resulting from the radome is at least partially compensated. For this purpose, the lens unit may include several lens elements and/or a lens element with a lens surface of a specially selected curvature. The lens surface may have concave, convex or alternating concave and convex portions in order to deflect the radar radiation onto the radome at a predetermined angle. By appropriate selection of the lens unit, it is possible to achieve a substantially homogeneous propagation of the radar radiation after passing through the radome.

The lens unit may be at least partially formed of plastic material. The refractive index of the plastic material in the wavelength range of the radar radiation influences the type of deflection of the radar radiation such that a desired solid angle distribution of the emitted radar radiation may be achieved by suitable material selection for the lens unit together with the corresponding selection of the shape of the lens unit.

As another example, the plastic material from which the lens unit is at least partially formed is transparent to radar radiation and opaque in the optical wavelength range. As an example, electromagnetic radiation in the optical wavelength range may be absorbed and/or reflected. As a result, the lens unit covers the radar apparatus in such a way that it is not visible to the observer, while the radar radiation may pass through the lens unit.

According to an exemplary embodiment, the lens unit may be formed at least partially by the movable handle element and/or the immovable handle element. In this case, the geometrical design of the movable handle element and/or the immovable handle element is selected such that the radar radiation emitted by the radar apparatus is deflected in the desired manner. As an example, the radar radiation may be emitted in a larger solid angle range or focused in a certain direction, i.e. in a certain solid angle range, by appropriate shaping of the movable or immovable handle element.

In one or more embodiments, the door handle assembly may include a heating device configured to thaw ice and snow in the vicinity of the radar apparatus. The heating device may be controlled by means of the sensor cables of the radar apparatus or by means of additional electrical connections. This ensures that the radar apparatus may also be operated reliably in winter time i.e. without causing any failures.

In one or more embodiment, the radar apparatus may be located on the support element, i.e. on a side of the support element which faces outwards after installation of the door handle assembly into the vehicle door. However, the fact that the radar apparatus is fixed to the support element may also mean that the radar apparatus is integrated into the support element, according to another embodiment of the door handle assembly. In this case, the support element forms part of the radar apparatus housing. The support element may have a connector interface for connecting the radar apparatus. For example, a cover configured to be a foil may be welded.

BRIEF DESCRIPTION OF THE DRAWINGS

The present invention is explained in more detail below on the basis of the embodiments illustrated in the Figures.

Figure 1:
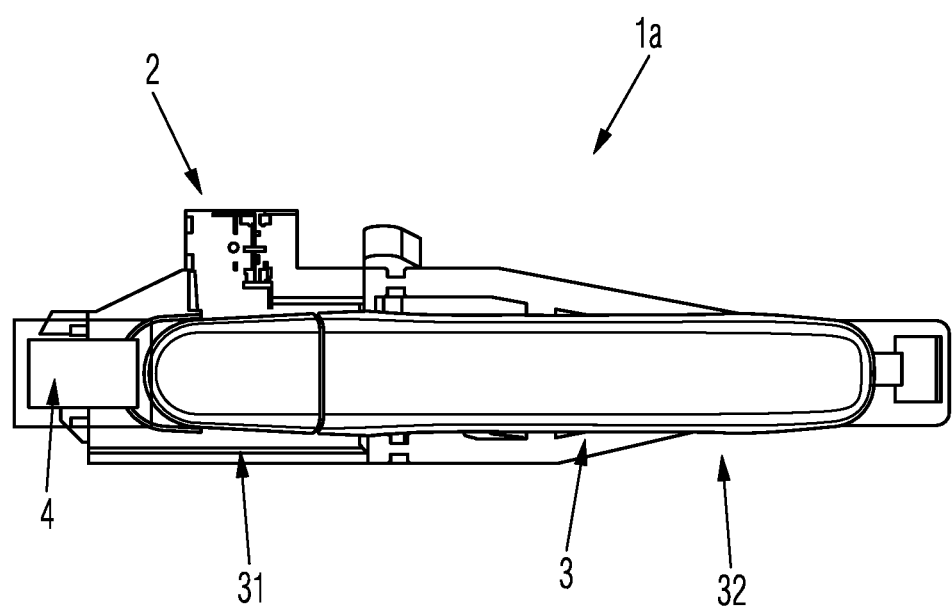
FIG. 1 shows a schematic top view of a door handle assembly according to a first embodiment of the disclosure.

The enclosed Figures are intended to provide a further understanding of the embodiments of the present invention. They illustrate embodiments and serve in connection with the description to explain the principles and concepts of the present invention. Further embodiments and many of the advantages mentioned above result from the description in combination with the Figures. The elements shown in the Figures are not necessarily drawn to scale.

In the Figures, like elements, features and components, which are functionally identical and have the same effect, are each indicated with like reference signs, unless otherwise stated.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

In order to compensate for tilting during non-vertical installation of radar apparatuses, document DE 10 2005 033414 A1 proposes to vary the thickness of a radome which is positioned in front of the radar apparatus. In this context, a radome is referred to as a protective cover of the radar apparatuses which provides protection protects against chemical and physical influences and is permeable to radar waves at the same time. Document DE 10 2010 042276 A1 discloses a radar sensor with at least three reference measuring ranges in order to be able to determine the mechanical sensor axis easily and reliably, thus enabling correct adjustment in case of maintenance. In document DE 10 2017 123981 A1 a lens including a negative refractive index is provided in front of a receiver configured to receive radar beams. Document DE 10237790 A1 refers to a device for detecting and evaluating objects in the surrounding area of a vehicle, and at least a portion of the radome is configured to be lens-shaped. Document DE 19951123 A1 refers to a radar transmitter, and a control circuit and a radar antenna are arranged in parallel. A radar sensor is known from document EP 2449406 B1, where a lens is arranged in front of the source, which is confined by a flat surface. Document EP 3422041 A1 refers to a housing for accommodating a beam-forming element as well as a sensor element, and a housing surface is surmounted by at least two collar elements, between which a flushing opening is located.

In motor vehicles, radar sensors are typically positioned behind already existing plastic components, for example in the area of the bumper, or behind a specially provided radome, which may be attached to the radiator while formed as a logo. The radar sensors are thus usually located in the front or rear area of the vehicle. Mounting radar sensors in the door area is more difficult since the metal components of the door are impenetrable for radar radiation.

A motor vehicle including a door is known from document DE 10 2016 220 084 A1, where a drive unit is configured to open and close the door automatically. A radar sensor is integrated into the door handle, and the door is opened if an approaching hand is detected on the basis of the radar data. The radar sensor may be installed in a handle plate of the door handle.

Figure 2:
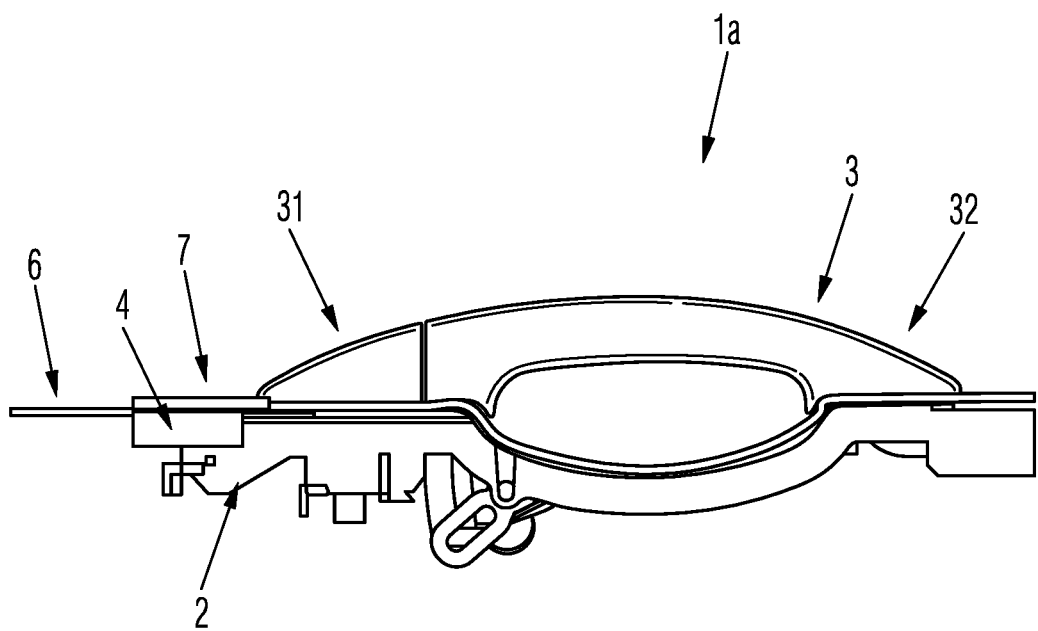
FIG. 2 shows a schematic cross-sectional view of a door handle assembly according to the first embodiment of the disclosure.

FIG. 1 shows a schematic top view of a door handle assembly 1a, and FIG. 2 shows a schematic cross-sectional view of the same door handle assembly 1a.

The door handle assembly 1a may include a support element 2 which acts as a support for a handle 3. The support element 2 thus forms a handle retaining bracket which is fixed to the door panel 6 when the vehicle door is assembled. The support element 2 may itself comprise coupling elements for this purpose or be coupled to the door panel 6 by means of additional coupling elements. The door panel 6 is thus not part of door handle assembly 1a, but the support element is configured to couple with the door panel 6 of the vehicle door.

The handle 3 is configured to be a two-part handle and thus may include a first handle element 31, which is immovable, i.e. fixed to the support element 2, and a second handle element 32, which is movable and is moved back to the initial position after operating the handle 3. The vehicle door is unlocked by actuating i.e. operating the handle. The first handle element 31 and the second handle element 32 together form a unit such that the surfaces of the two handle elements 31, 32 merge into each other, provided that the movable handle element 32 is in the initial position. However, the present invention is not limited to the embodiment shown. As an example, the handle 3 may also be formed in one piece, i.e. the immovable first handle element 31 may be omitted.

The door handle assembly 1a further may include a radar apparatus 4, which is preferably configured to have small dimensions. As an example, a radar transceiver which is as compact as possible may be provided for this purpose by means of semiconductor technology and such as by means of CMOS technology as part of the radar apparatus 4, i.e. a device which both emits radar waves and receives reflected radar waves.

The radar apparatus 4 may comprise a transmitter-receiver antenna, which may be arranged on a common semiconductor chip including corresponding evaluation electronics. The radar apparatus 4 may be configured to evaluate electronic data such that a high signal-to-noise ratio may be achieved due to short signal paths. However, it is also possible to evaluate the sensor data acquired by the radar apparatus 4 externally, e.g. by means of evaluation electronics which are not part of door handle assembly 1a. In this case, the radar apparatus 4 is configured to transmit the sensor data to the evaluation electronics. The evaluation electronics may be a door control unit, for example.

In the door handle assembly 1a shown in FIGS. 1 and 2, the radar apparatus 4 is arranged on a section of the support element 2 which is not covered by the first handle element 31 and the second handle element 32. Radar apparatus 4 is shielded by a radome 7. The door panel 6 may have appropriate recesses to accommodate the door handle assembly such that the radar apparatus 4 is not obscured by metallic elements of the door panel 6. The radome 7 consists at least partially of plastic material, which is permeable to radar radiation.

Figure 3:
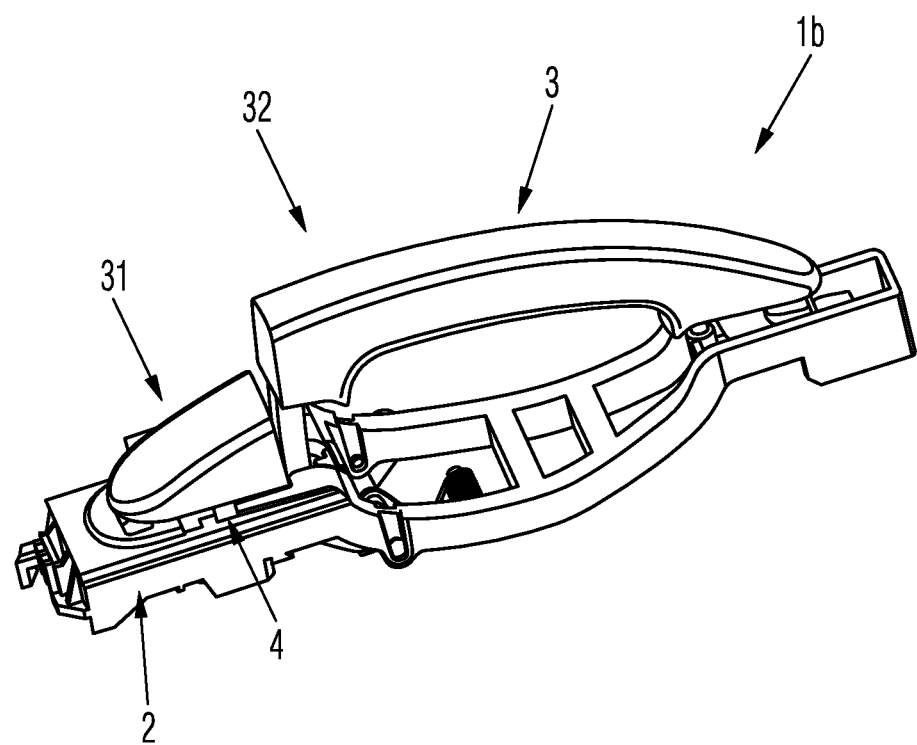
FIG. 3 shows a schematic oblique view of a door handle assembly according to a second embodiment of the disclosure.
Figure 4:
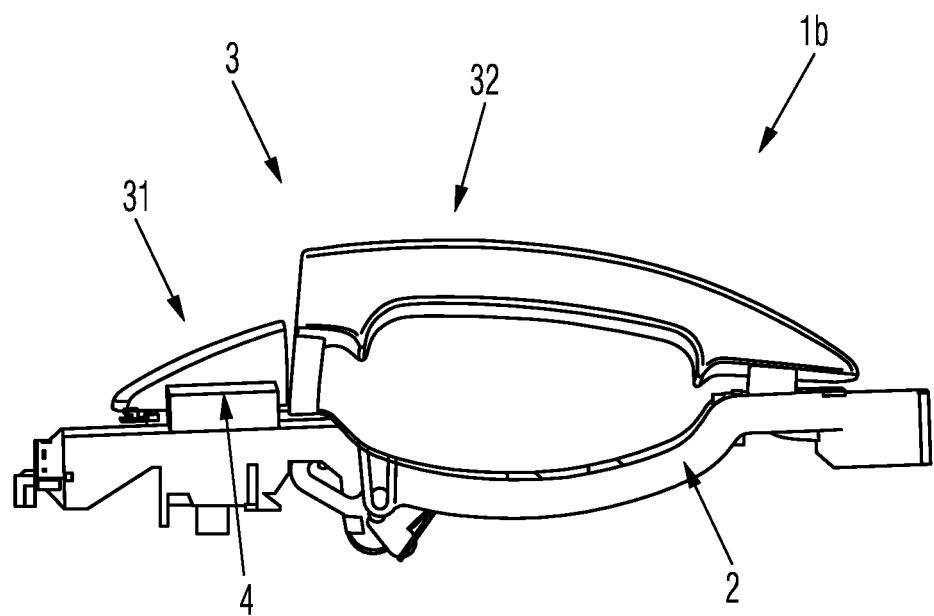
FIG. 4 shows a schematic cross-sectional view of the door handle assembly according to the second embodiment of the disclosure.

FIG. 3 shows a schematic oblique view of a further door handle assembly 1b, and FIG. 4 shows a schematic cross-sectional view of the same door handle assembly 1b. Door handle assembly 1b differs from door handle assembly 1a shown in FIGS. 1 and 2 by the positioning of the radar apparatus 4, which is fixed to the support element 2 in such a way that it is concealed by the fixed handle element 31. The fixed handle element 31 thus functions as a radome, thus protecting the radar apparatus 4 from environmental influences. The radar apparatus 4 is arranged parallel to a corresponding portion of the support element 2, and the portion runs parallel to the door panel 6 of the vehicle door upon installation of the door handle assembly 1b. The radar apparatus 4 may preferably be configured to emit radar radiation substantially symmetrical to the normal direction with respect to the parallel portion of the support element 2.

According to further embodiments, radar apparatus 4 may also be tilted. As an example, the radar apparatus 4 may be oriented such that a surface of the radar apparatus 4 is substantially parallel to the inclined surface of the immobile handle element 31. On the one hand, this may prevent asymmetrical deflection of the radar radiation by the immovable handle element 31, which functions as a radome 7. On the other hand, such a tilted arrangement of the radar apparatus 4 allows improved detection of a certain solid angle range. When the door handle assembly 1b is installed, the emitting direction of the radar apparatus 4 may be slightly inclined against the direction of travel, i.e. slightly backwards, and may improve the blind spot monitoring for the driver.

Figure 5:
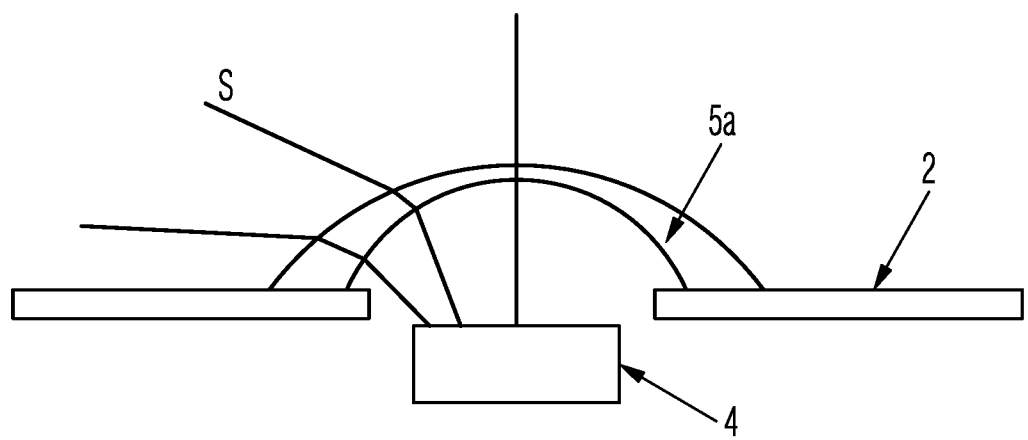
FIG. 5 shows a schematic partial cross-sectional view of a door handle assembly including a lens unit according to a first modification of the disclosure.

FIG. 5 shows a schematic partial cross-sectional view of a door handle assembly including a lens unit 5a. The door handle assembly may be one of door handle assemblies 1a or 1b described in FIGS. 1 and 2 or FIGS. 3 and 4, or any variation of these door handle assemblies 1a or 1b. However, lens unit 5a may be used with a different arrangement of radar apparatus 4. Lens unit 5a is configured to be a fisheye lens, thus dispersing the radar radiation S emitted by radar apparatus 4, such that the largest possible detection range, preferably at least 160 degrees, such as 180 degrees, may be achievable.

Figure 6:
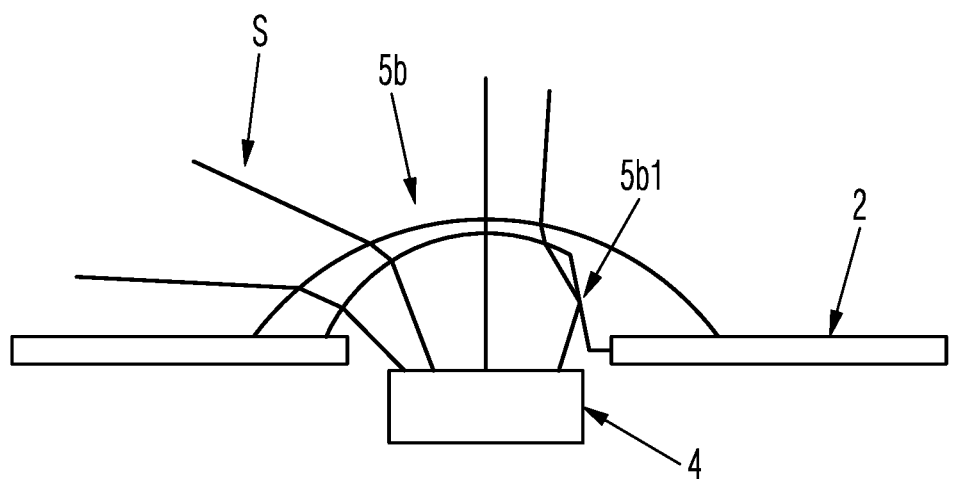
FIG. 6 shows a schematic partial cross-sectional view of a door handle assembly including a lens unit according to a second modification.

FIG. 6 shows a schematic partial cross-sectional view of a door handle assembly including a lens unit 5b according to a second configuration, which may also be part of any of the door handle assemblies 1a or 1b described above. The lens unit 5b differs from the lens unit 5a illustrated in FIG. 5 in that it has a reflecting surface 5b1 which reflects part of the radar radiation S emitted by radar apparatus 4 and deflects it to another area of the lens unit 5b. The radar radiation S may be reflected at the reflecting surface 5b1 by total reflection at the transition interface. In addition or alternatively, the reflecting surface 5b1 may have a metallized layer which is configured to reflect the radar radiation S at least partially. This allows the radar radiation S to be focused, and certain solid angle ranges may be blanked out. The reflection at the reflecting surface 5b1 is taken into account by the evaluation electronics to determine the correct position of objects in the vicinity of the vehicle.

Figure 7:
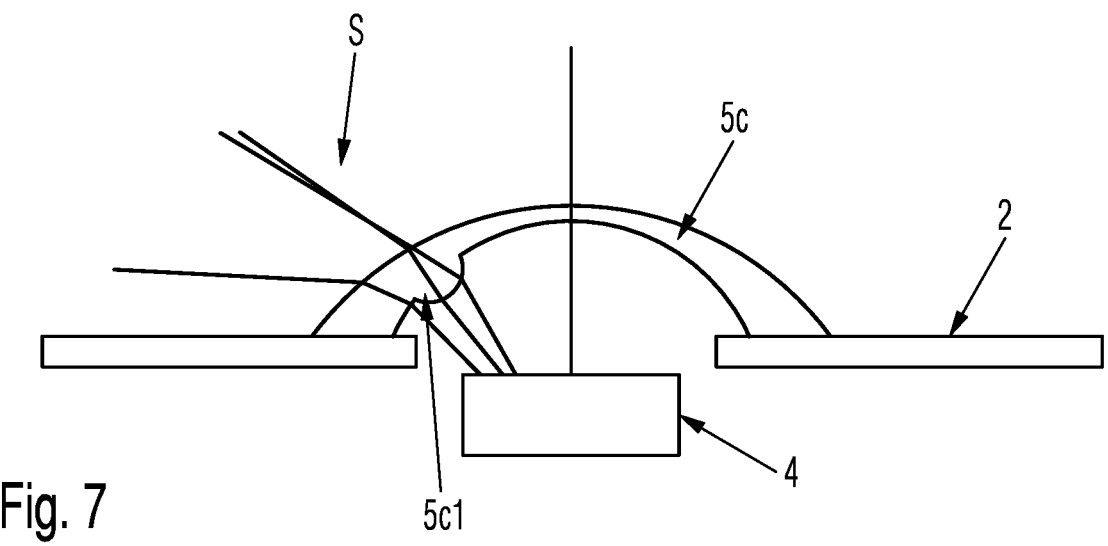
FIG. 7 shows a schematic partial cross-sectional view of a door handle assembly including a lens unit of a third modification.

FIG. 7 shows a schematic partial cross-sectional view of a door handle assembly including a lens unit 5c according to a third configuration, which may also be part of any of the door handle assemblies 1a or 1b described above. The lens unit 5c may include a focusing element 5c1 which focuses radar radiation S which is emitted by radar apparatus 4 and which is incident on the focusing element 5c1, or which focuses the radar radiation S to a specific solid angle range. Thus the radar apparatus 4 is suitable both for monitoring a wide solid angle range and for special monitoring of a specially selected solid angle range. In accordance with other embodiments, the lens unit 5c may have any number of focusing elements 5c1, such that several solid angle ranges may be specially monitored.

Figure 8:
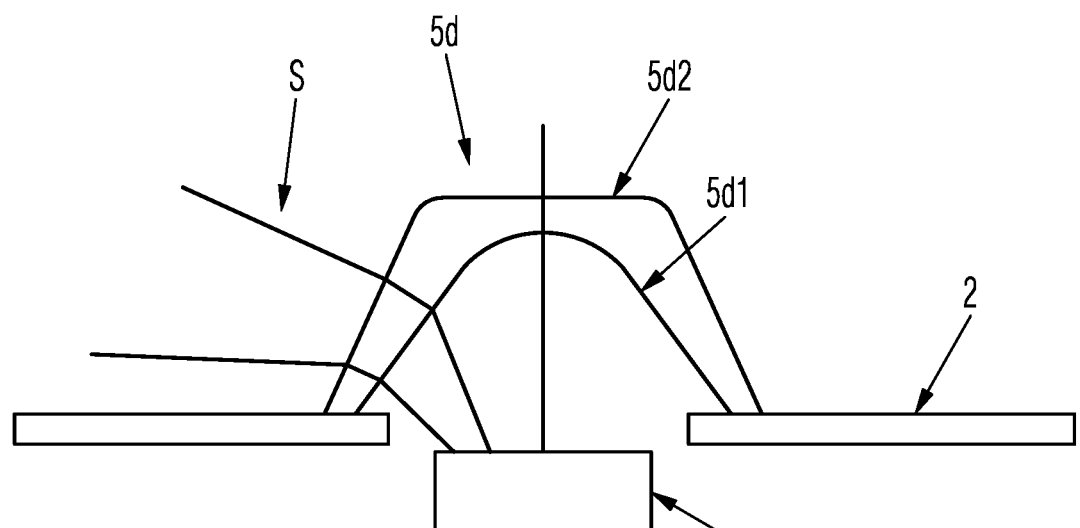
FIG. 8 shows a schematic partial cross-sectional view of a door handle assembly including a lens unit of a fourth modification.

FIG. 8 shows a schematic partial cross-sectional view of a door handle assembly including a lens unit 5d according to a fourth configuration. The lens unit 5d is formed by a movable or fixed handle element 31, 32. The lens unit 5d has a substantially hyperbolically shaped inner surface 5d1 and a trough-shaped outer surface 5d2, and the outer surface 5d2 has a flat first portion parallel to the support element 2 and second portions tapering towards the first portion. In general, the outer surface 5d2 may be predetermined by the configuration of the handle member 31, 32, and the inner surface 5d1 is configured to deflect the radar radiation in a desired manner. By this configuration a characteristic deflection of the radar radiation S may be achieved, and a large solid angle range may be detected.

The lens units 5a-5d shown in FIGS. 5 to 8 may have several layers, and the layers may comprise composite materials for example. This may improve the refractive properties of the lens units 5a-5d.

In addition, the lens units may have cavities, i.e. air chambers or cavities filled with a gel, for example, thereby the radar radiation may be focused on certain solid angle ranges or certain solid angle ranges may be shielded or blanked out.

Figure 9:
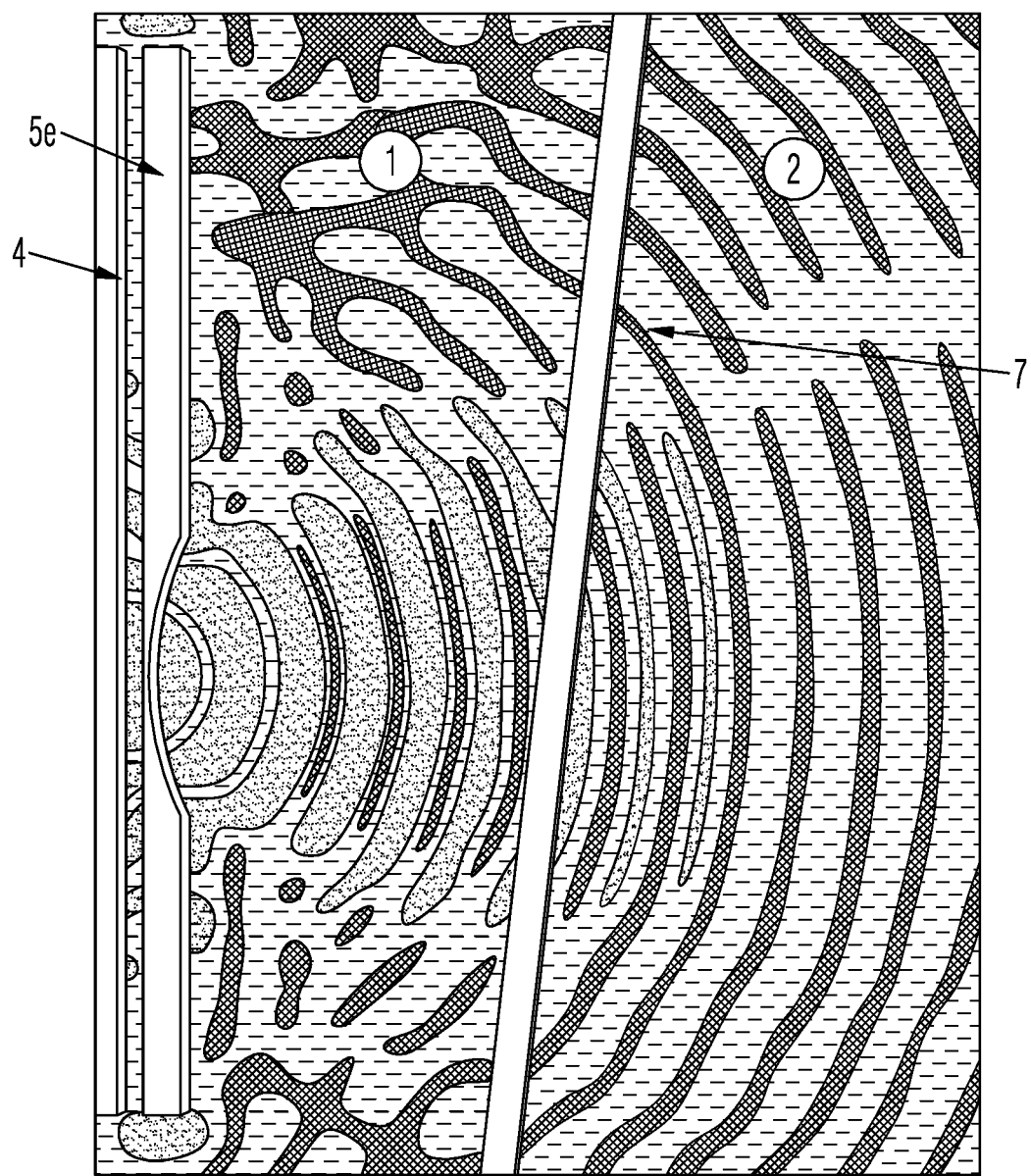
FIG. 9 shows a schematic partial cross-sectional view of a door handle assembly to illustrate compensation by a lens unit for radiation deflection caused by a radome.

FIG. 9 shows a schematic partial cross-sectional view of a door handle assembly in order to illustrate compensation for radiation deflection caused by a radome 7 using a lens unit 5e. The surface of the radome 7 is inclined with respect to the surface of the radar apparatus 4 such that, in the absence of a lens unit 5e, an inhomogeneous solid angle distribution of the radar radiation S would result due to refractive effects. The lens unit 5e is shaped in such a way that the deflection of the radiation may be completely or substantially compensated. While the radar radiation S propagates inhomogeneously in a first region, which is indicated by a circled "1" and which is between the lens unit 5e and the radome 7, the radar radiation S propagates substantially homogeneously in a second region, which is indicated by a circled "2" and which is outside the radome 7. The lens unit 5e preferably may include a central convex region and adjoining portions having substantially parallel surfaces. Compensation may be achieved by suitable selection of the surface of the convex area. The exact shape of the lens unit 5e may be determined by computer-implemented modeling, especially by computer-implemented solution of an optimization problem. FIG. 9 has been created by such a calculation.

Figure 10:
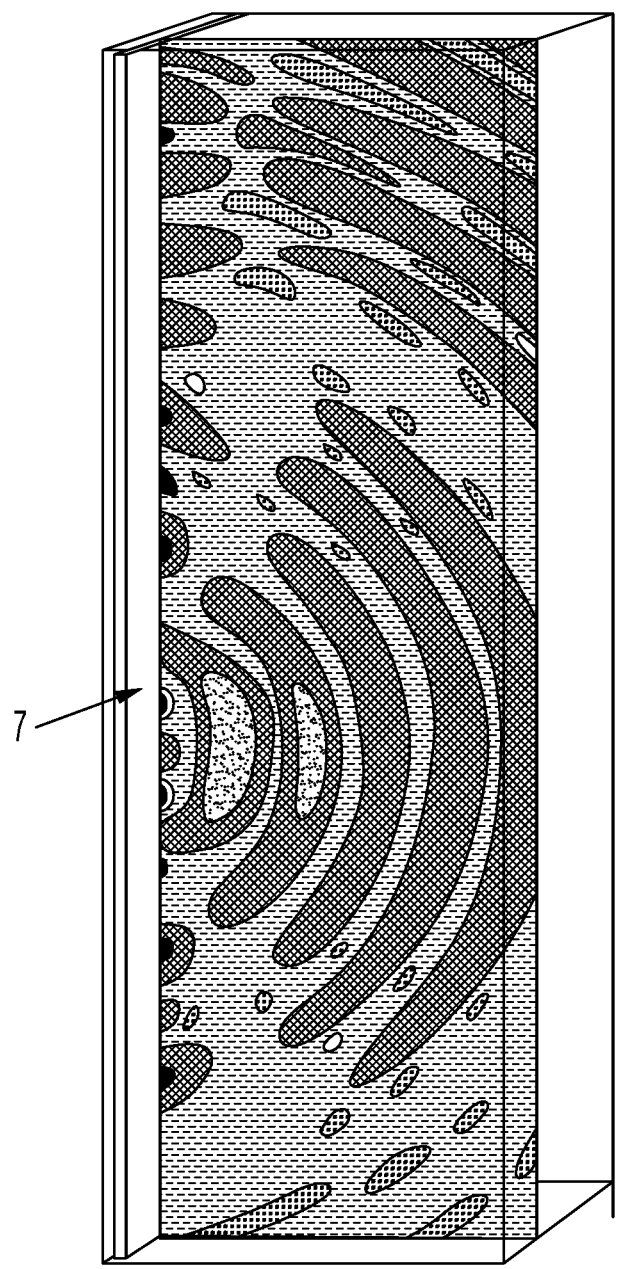
FIG. 10 shows a schematic view of a radar beam outside the radome.

FIG. 10 shows a schematic representation of the radar radiation S outside the radome 7, which was calculated by means of modeling. It may be seen that the radiation deflection due to the radome 7 is essentially compensated, i.e. the radar radiation S propagates essentially homogeneously.

Figure 11:
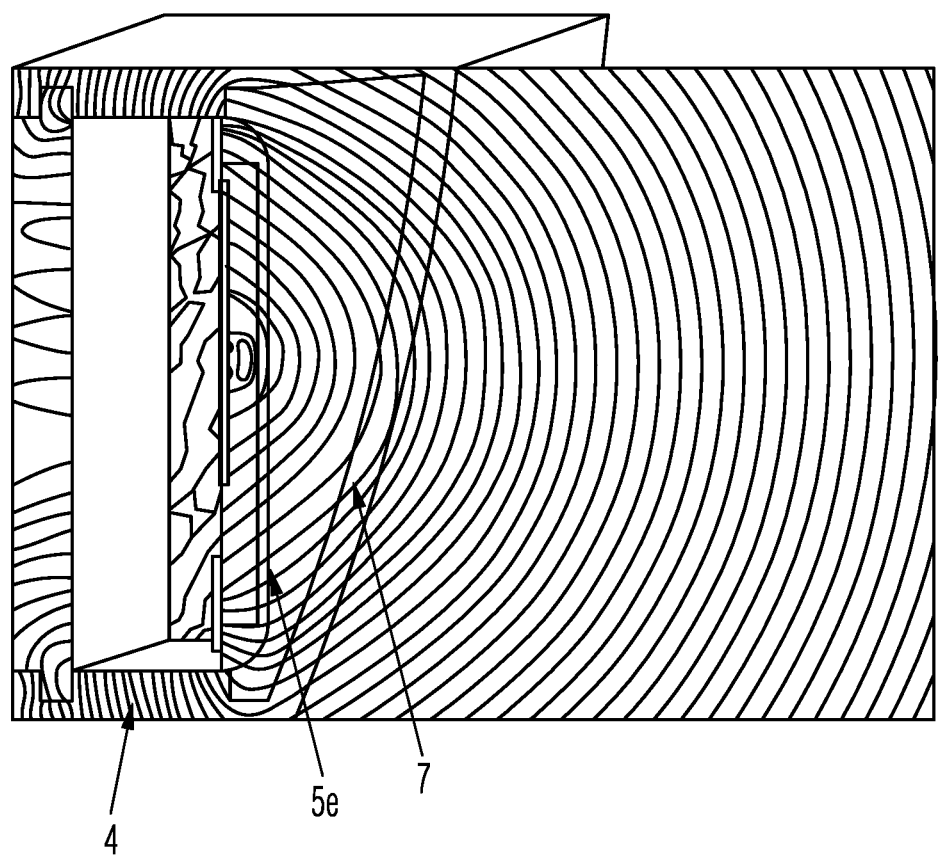
FIG. 11 shows a further schematic partial cross-sectional view of a door handle assembly to illustrate compensation for a radome induced deflection of radiation by a lens unit.

FIG. 11 shows a further schematic partial cross-sectional view of a door handle assembly explaining compensation of a radiation deflection caused by a radome by means of a lens unit 5e, which in turn has been calculated by modeling, and where it may be seen that the radar radiation S propagates substantially homogeneously outside the radome 7.

The present disclosure is not limited to the embodiments shown. For example, a plurality of radar apparatuses 4 may be provided in the door handle assembly 1a, 1b. These may be differently aligned, for example. For example, one of the radar apparatuses 4 may be aligned parallel to the surface of a fixed handle element 31 as described above, while another radar apparatus 4 is aligned parallel to the support element 2 or door panel 6. By using the radar apparatuses 4 together, it is possible to monitor a large solid angle range.

Figure 12:
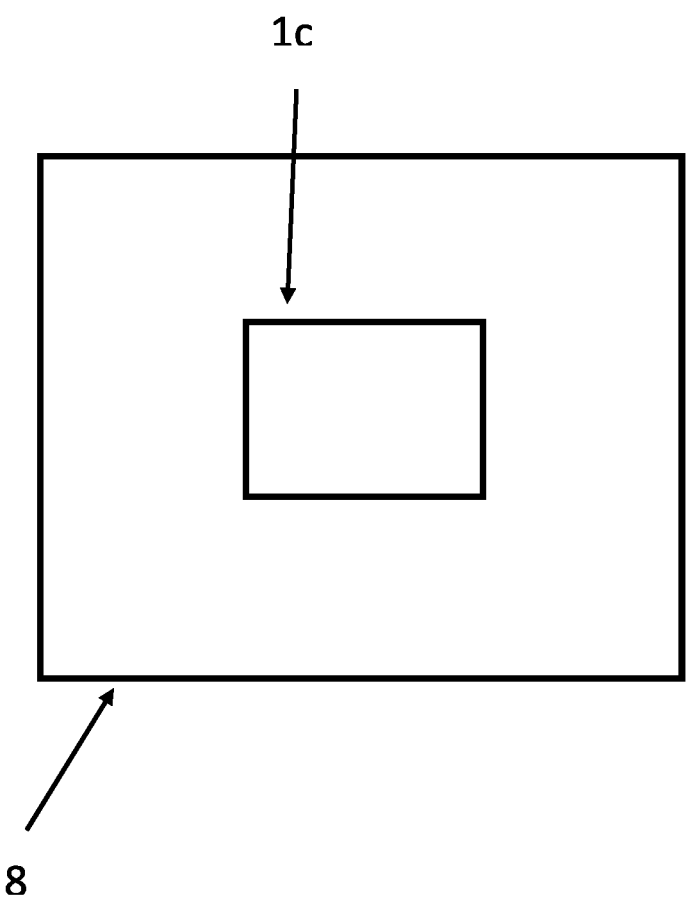
FIG. 12 shows a schematic block diagram of a vehicle door including a door handle assembly according to an embodiment of the present disclosure.

FIG. 12 shows a schematic block diagram of a vehicle door 8 including a door handle assembly 1c. Door handle assembly 1c may be any of the door handle assemblies 1a, 1b described above. For example, the door handle assembly may comprise one of the lens units 5a-5e described above.

Figure 13:
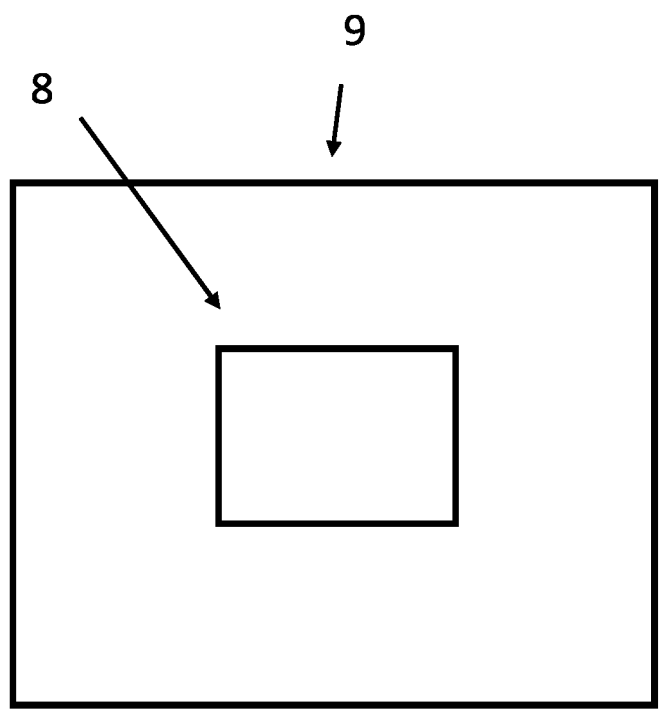
FIG. 13 shows a schematic block diagram of a vehicle including a vehicle door according to an embodiment of the present disclosure.

FIG. 13 shows a schematic block diagram of a motor vehicle including a vehicle door 8 which is illustrated in FIG. 12.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

LIST OF REFERENCE SIGNS 1a-c Door handle assembly
2 Support element
3 Door handle
31 Fixed handle element
32 Movable handle element
4 Radar apparatus
5a-e Lens unit
5b1 Reflective surface
5c1 Focusing element
5d1 Inner surface of the lens unit
5d2 Outer surface of the lens unit
6 Door panel
7 Radome
8 Vehicle door
9 Vehicle While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A door handle assembly for integration to a vehicle door, the door handle assembly comprising:
   a support element configured to be coupled to the vehicle door;
   a handle element arranged on the support element;
   a radar apparatus configured to emit radar radiation and receive reflected radar radiation, wherein the radar apparatus is disposed on either the support element or on or in the handle element; and
   a lens unit configured to at least partially deflect the radar radiation emitted by the radar apparatus, wherein the lens unit includes reflecting elements configured to at least partially focus the radar radiation into a predetermined solid angle range.

2. The door handle assembly of claim 1, further comprising a fixed handle element arranged on the support element, wherein the handle element is movable with respect to the fixed handle element, and wherein the radar apparatus is at least partially concealed by the fixed handle element.

3. The door handle assembly of claim 1, wherein the lens unit is disposed on the support element.

4. The door handle assembly of claim 3, wherein the lens unit includes at least one portion, wherein the at least one portion is opaque to block portions of the radar radiation.

5. The door handle assembly of claim 4, wherein the at least one portion includes at least one metallic or metallized layer and/or at least one electrically conductive material.

6. The door handle assembly of claim 5, wherein the lens unit includes a plastic element enclosing a cavity, wherein the cavity shields and/or focuses the radar radiation.

7. The door handle assembly of claim 3, wherein the lens unit is a radome configured to protect the radar apparatus.

8. The door handle assembly of claim 3, further comprising a radome configured to protect the radar apparatus, wherein the lens unit is positioned between the radar apparatus and the radome.

9. The door handle assembly of claim 8, wherein the lens unit is configured to at least partially compensate for radar radiation deflected by the radome.

10. The door handle assembly of claim 3, wherein the lens unit is at least partly formed of a plastic material.

11. The door handle assembly of claim 10, wherein the plastic material is at least partially transparent to facilitate propagation of the radar radiation through the plastic material, and wherein the plastic material is visually opaque.

12. The door handle assembly of claim 1, wherein the lens unit includes a fisheye lens configured to increase an aperture angle of the radar radiation emitted from the radar apparatus.

13. A vehicle door comprising:
a support element configured to be coupled to a surface of the vehicle door;
a handle element arranged on the support element;
a radar apparatus configured to emit radar radiation and receive reflected radar radiation, wherein the radar apparatus is disposed on either the support element or on the handle element; and
a lens unit provided with a fisheye lens configured to increase an aperture angle of the radar radiation emitted from the radar apparatus,
wherein the lens unit includes reflecting elements configured to at least partially focus the radar radiation into a predetermined sold angle range.

14. The vehicle door of claim 13, wherein the lens unit includes an outer surface and an inner surface, wherein the inner surface is concave with respect to the support element.

15. The vehicle door of claim 14, wherein a portion of the outer surface is parallel to the support element.

16. The vehicle door of claim 14, wherein the radar apparatus is configured to emit the radar radiation at a first angular range, wherein the inner surface includes a focusing element configured to focus the radar radiation at a second angular range, wherein the second angular range is less than the first angular range.

17. A vehicle comprising:
a vehicle door having an outer surface provided with a first color;
a support element configured to be coupled to a surface of the vehicle door;
a handle element arranged on the support element;
a radar apparatus configured to emit radar radiation and receive reflected radar radiation, wherein the radar apparatus is disposed on either the support element or on or in the handle element; and
a lens unit provided with a fisheye lens configured to increase an aperture angle of the radar radiation emitted from the radar apparatus, wherein the lens unit includes reflecting elements configured to at least partially focus the radar radiation into a predetermined solid angle range.

18. The vehicle of claim 17, further comprising a radome configured to protect the radar apparatus, wherein the radome is provided with the first color.

19. The vehicle of claim 17, wherein at least a portion of the radar apparatus is disposed in the support element.

* * * * *